US007643792B2

(12) United States Patent
Kim et al.

(10) Patent No.: US 7,643,792 B2
(45) Date of Patent: Jan. 5, 2010

(54) SATELLITE GROUND CONTROL SYSTEM USING COMMUNICATION SATELLITE

(75) Inventors: Tae-Hee Kim, Daejon (KR); Jeom-Hun Lee, Daejon (KR); Jae-Hoon Kim, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 540 days.

(21) Appl. No.: 11/646,392

(22) Filed: Dec. 28, 2006

(65) Prior Publication Data
US 2008/0092180 A1    Apr. 17, 2008

(30) Foreign Application Priority Data
Sep. 28, 2006   (KR) ...................... 10-2006-0094979

(51) Int. Cl.
*H04B 7/185* (2006.01)
(52) U.S. Cl. ..................... 455/12.1; 455/11.1; 455/430; 455/67.11; 455/427; 725/63; 725/60
(58) Field of Classification Search ................ 455/12.1, 455/427, 428, 430, 11.1, 13.1, 92, 115.1, 455/507, 515, 67.11, 552.1; 725/63, 60, 725/61; 701/3, 13
See application file for complete search history.

(56) References Cited

U.S. PATENT DOCUMENTS

| 5,372,340 | A | * | 12/1994 | Ihara et al. | ................ | 244/172.5 |
| 6,133,854 | A | * | 10/2000 | Yee et al. | .................... | 340/907 |
| 7,428,405 | B2 | * | 9/2008 | Kim et al. | .................. | 455/12.1 |
| 2002/0171011 | A1 | * | 11/2002 | Lopata et al. | ................ | 244/172 |
| 2003/0098810 | A1 | * | 5/2003 | Lee et al. | ................ | 342/357.06 |
| 2004/0137842 | A1 | * | 7/2004 | Iwata et al. | ................. | 455/12.1 |
| 2006/0100752 | A1 | * | 5/2006 | Kim et al. | ..................... | 701/13 |

FOREIGN PATENT DOCUMENTS

| KR | 1996-0036378 | 10/1996 |
| KR | 10-0267275 | 7/2000 |
| KR | 10-2004-0056973 | 7/2004 |
| KR | 1020060054604 | 5/2006 |
| KR | 10-0653185 | 11/2006 |
| KR | 10-0695332 | 3/2007 |

OTHER PUBLICATIONS

Notice of Allowance for Korean Application 10-2006-0094979.

* cited by examiner

*Primary Examiner*—Tan Trinh
(74) *Attorney, Agent, or Firm*—Lowe Hauptman Ham & Berner, LLP

(57) ABSTRACT

Provided is a satellite ground control system and method based on a communication satellite. The system includes: a communication satellite link means for monitoring and controlling a system device and transmitting remote measurement data and a process result to the central control station; an interface for analyzing the command, transmitting the command to a processing means and transmitting remote measurement data and a process result to the communication satellite link means; a satellite operating means for receiving a command from the interface, transforming the command into a remote command and transmitting remote measurement data to the interface; and a control satellite link means for transmitting the received remote command, receiving the remote measurement data, transmitting the remote measurement data to the satellite operating means, and transmitting a process result of monitor and control of a corresponding system device to the interface.

5 Claims, 4 Drawing Sheets

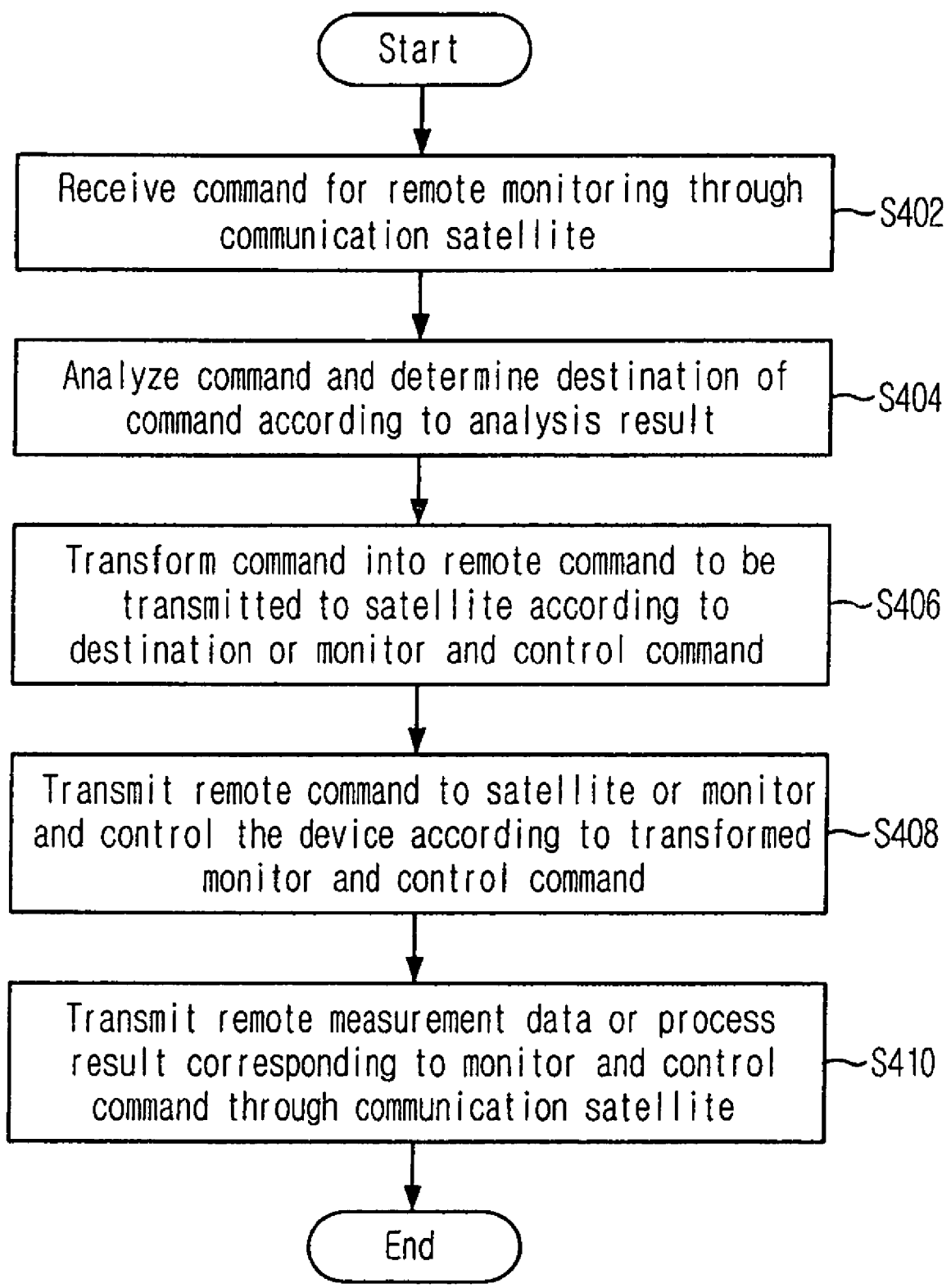

SATELLITE GROUND CONTROL SYSTEM USING COMMUNICATION SATELLITE

FIELD OF THE INVENTION

The present invention relates to a satellite ground control system and method based on a communication satellite; and, more particularly, to a satellite ground control system which can easily monitor and control locally distributed satellite ground control systems by receiving a command from a central control station through a communication satellite, detects a destination of the command, i.e., the satellite or the ground control system, transmitting each command to a corresponding processing means, monitoring and controlling the satellite or the ground control system, and transmitting results in a reverse sequence.

DESCRIPTION OF RELATED ART

In general, satellite ground control systems are distributed in many places to precisely control a multi-satellite. Also, an operator constantly operates a satellite based on the satellite ground control system. The satellite ground control system should be located in a proper place to control the multi-satellite and requires communicating with a central control station.

When the satellite ground control system for controlling the multi-satellite is located in a place where the general communication infrastructure is not set up such as the North Pole, the South Pole, a remote place and an island, a new network needs to be set up. The setup of the network increases a cost. When the satellite ground control system is independently operated in a corresponding system without setup of the new network, there are problems that human power is required and a cost increases a lot.

The conventional satellite ground control system has a problem that the satellite is controlled by setting up an individual network or inputting human power to communicate with the central control station.

SUMMARY OF THE INVENTION

It is, therefore, an object of the present invention to provide a satellite ground control system and method which can easily monitor and control locally distributed satellite ground control systems by receiving a command from a central control station through a communication satellite, detecting a destination of the command, i.e., the satellite or the ground control system, transmitting each command to a corresponding processing means, monitoring and controlling the satellite or the ground control system, and transmitting a result in a reverse sequence.

Other objects and advantages of the invention will be understood by the following description and become more apparent from the embodiments in accordance with the present invention, which are set forth hereinafter. It will be also apparent that objects and advantages of the invention can be embodied easily by the means defined in claims and combinations thereof.

In accordance with an aspect of the present invention, there is provided a satellite ground control system based on a communication satellite, the system including: a communication satellite link for monitoring and controlling a corresponding system device according to a monitor and control command among commands transmitted from an external central control station through the communication satellite and transmitting remote measurement data for a remote command and a process result for the monitor and control command to the central control station through the communication satellite; an interface for analyzing the transmitted command, transmitting the command to a corresponding processing means and transmitting remote measurement data of a remote command and a process result of the monitor and control command to the communication satellite link; a satellite operating means for receiving a command related to a mission satellite from the interface, transforming the command into a remote command and transmitting remote measurement data of the transformed remote command to the interface; and a control satellite link for transmitting the received remote command in the satellite operating means, receiving the remote measurement data, transmitting the remote measurement data to the satellite operating means, and transmitting a process result of monitor and control of a corresponding system device to the interface according to the monitor and control command from the interface.

In accordance with another aspect of the present invention, there is provided a satellite control method based on a communication satellite, the method including the steps of: a) receiving a command for remote monitoring through the communication satellite from a central control station; b) analyzing the received command, and detecting destinations of the command; c) transforming the command into one between a remote command to be transmitted to the mission satellite and a monitor and control command according to the determined destination; d) transmitting the transformed remote command to a mission satellite or monitoring and controlling a corresponding device according to the transformed monitor and control command; and e) receiving one between remote measurement data transmitted from the mission satellite and a process result of the monitor and control command, and transmitting the remote measurement data to the central control station.

BRIEF DESCRIPTION OF THE DRAWINGS

The above and other objects and features of the present invention will become apparent from the following description of the preferred embodiments given in conjunction with the accompanying drawings, in which:

FIG. 4 is a flowchart describing a satellite control method based on the communication satellite in accordance with an embodiment of the present invention.

DETAILED DESCRIPTION OF THE INVENTION

Other objects and advantages of the present invention will become apparent from the following description of the embodiments with reference to the accompanying drawings. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
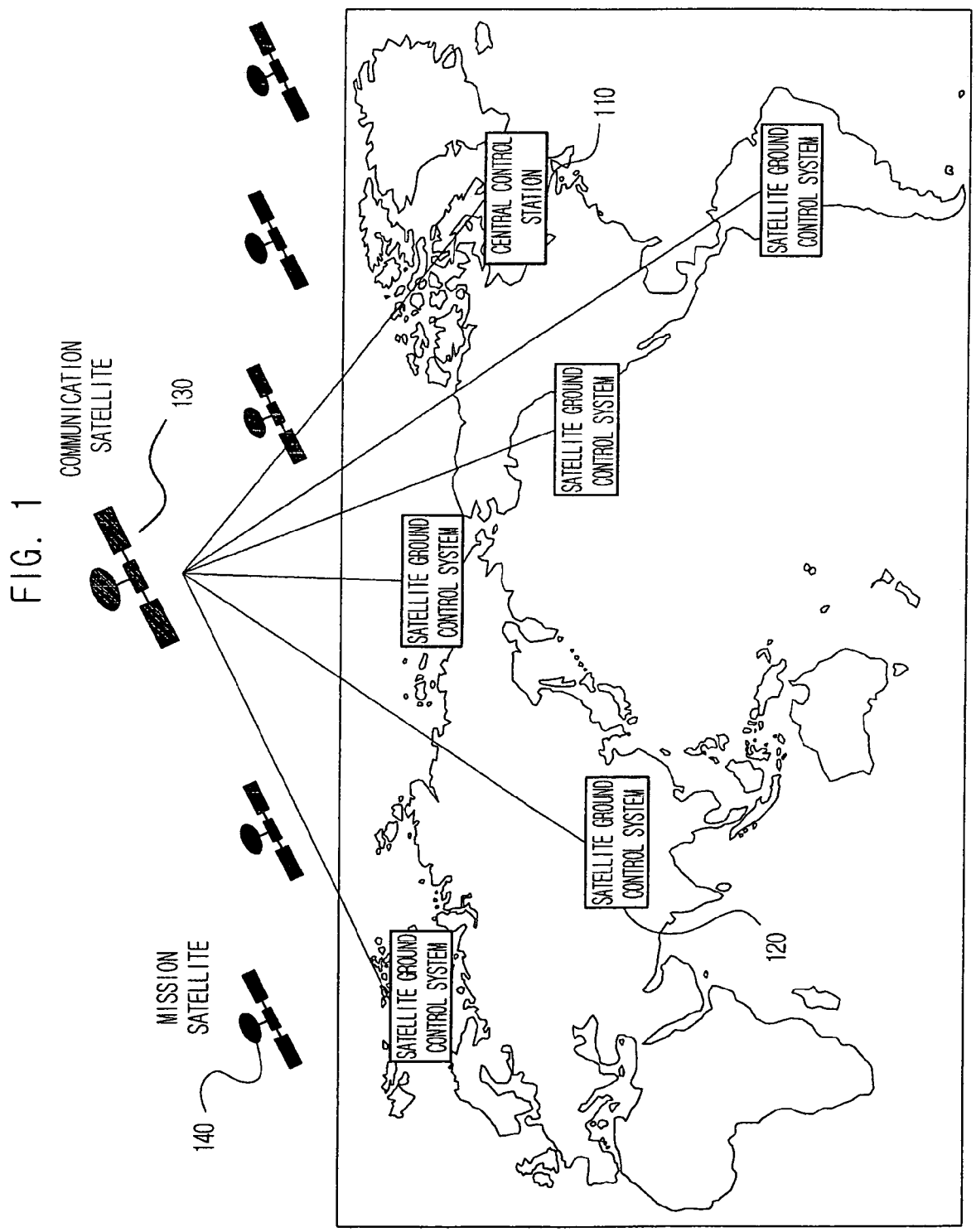
FIG. 1 shows a system for performing remote satellite control based on a communication satellite to which the present invention is applied.

FIG. 1 shows a system for performing remote satellite control based on a communication satellite to which the present invention is applied. The system for performing remote satellite control based on the communication satellite includes a central control station 110, a satellite ground control system 120, a communication satellite 130 and a mission satellite 140.

The central control station 110 monitors or controls a plurality of satellite ground control systems 120 based on the communication satellite 130. The central control station 110 creates a command to be performed in the communication satellite 130 and the satellite ground control system 120 having an interface.

A remote command to be transmitted to the mission satellite 140 among the created commands to be transmitted to the satellite ground control system 120 includes time information for accessing to the satellite and a satellite mission command to be subsequently performed. The central control station 110 transmits a command to the satellite ground control system 120 through the communication satellite 130. Subsequently, the central control station 110 collects remote measurement data from the satellite ground control system 120. The central control station 110 receives and processes the remote measurement data through the communication satellite 130.

The satellite ground control system 120 receives and processes a monitor and control command from the central control station 110. The satellite ground control system 120 also controls the corresponding mission satellite 140.

Figure 2:
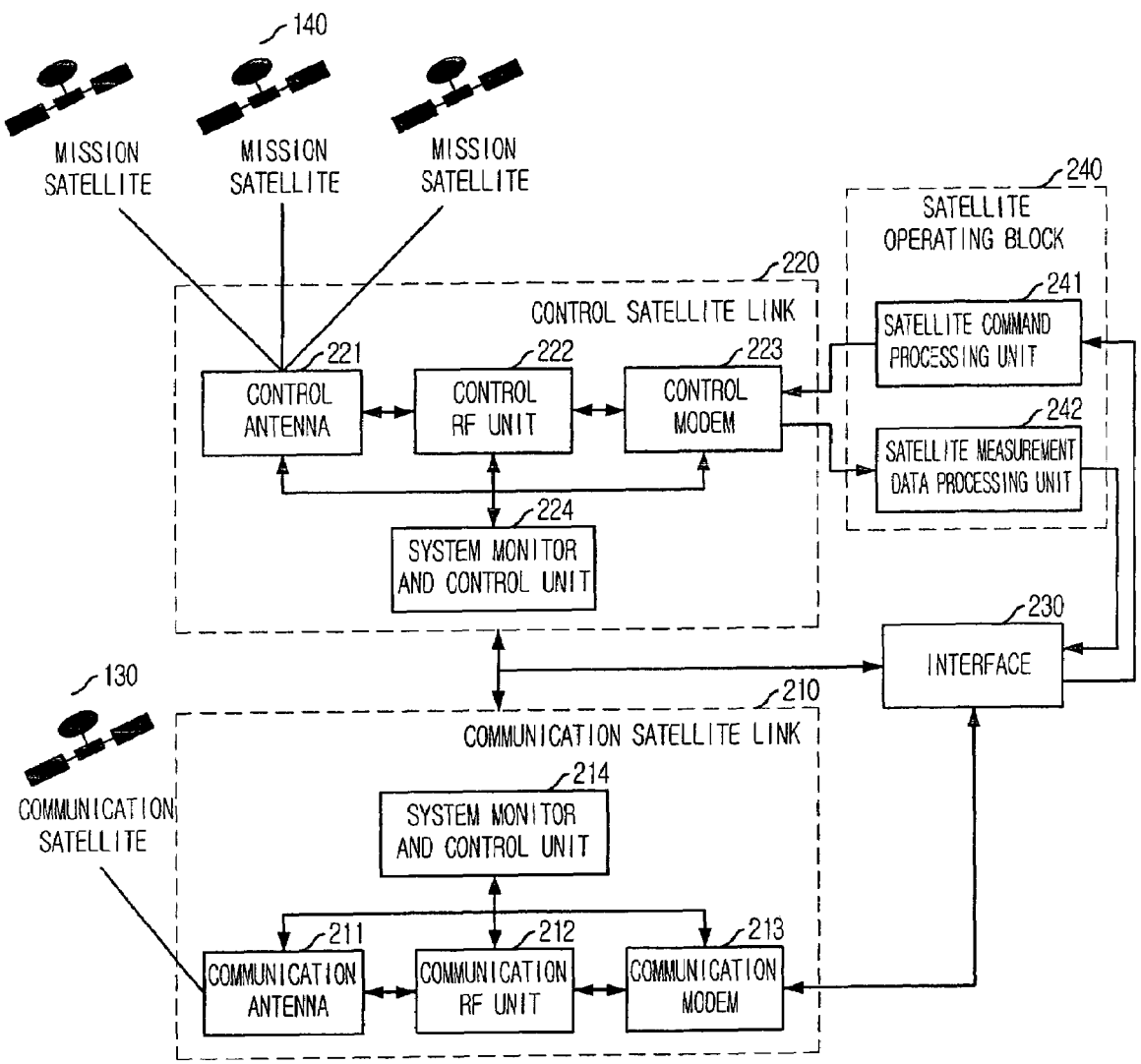
FIG. 2 is a block diagram showing a satellite ground control system based on the communication satellite in accordance with the embodiment of the present invention.

FIG. 2 is a block diagram showing a satellite ground control system based on the communication satellite in accordance with the embodiment of the present invention. The satellite ground control system based on the communication satellite includes a communication satellite link 210, a control satellite link 220, an interface 230, and a satellite operating block 240. The communication satellite link 210 includes a communication antenna 211, a communication Radio Frequency (RF) unit 212, a communication modem 213, and a system monitor and control unit 214. The control satellite link 220 includes a control antenna 221, a control RF unit 222, a control modem 223, and a system monitor and control unit 224.

The communication satellite link 210 creates communication interface with the central control station 110 through the communication satellite 130. That is, the communication satellite link 210 receives a command from the central control station 110 based on the communication satellite 130. The communication satellite link 210 receives a command through the communication antenna 211, the communication RF unit 212, and the communication modem 213. Subsequently, the communication satellite link 210 transmits the received command to the interface 230. The system monitor and control unit 214 receives the monitor and control command from the interface 230, monitors and controls each constitutional element and transmits a process result of the monitor and control command to the interface 230.

The command transmitted from the central control station 110 is divided into a remote command for performing a mission and a monitor and control command. The remote command for performing the mission is transmitted from the central control station 110 and to the mission satellite 140. The monitor and control command monitors or controls a system of the communication satellite link 210 and the control satellite link 220.

The interface 230 receives and analyzes the command of the central control station 110 from the communication satellite link 210. The interface 230 divides and transmits the received command into the satellite and the satellite ground control system based on the analysis result. That is, the interface 230 receives the command of the central control station 110 through the communication satellite link 210 and transforms the command of the central control station 110 into a command for monitoring and controlling the satellite ground control system 120 or the mission satellite 140. The interface 230 transmits the command to the system monitor and control units 214, 224 or a satellite command processing unit 241 of the satellite operating block 240 according to a destination of the command. Also, the interface 230 receives the process result of the monitor and control command or the remote measurement data from the system monitor and control units 214, 224 or a satellite measurement data processing unit 242. Subsequently, the interface 230 transmits the process result of the monitor and control command or the remote measurement data to the central control station 110 through the communication satellite 130.

The satellite operating block 240 includes the satellite command processing unit 241 and the satellite measurement data processing unit 242. The satellite command processing unit 241 receives a remote command for satellite control from the interface 230 and transmits the remote command to the control satellite link 220. The satellite measurement data processing unit 242 receives the remote measurement data from the mission satellite 140 through the control satellite link 220 and transmits the remote measurement data to the interface 230.

The satellite command processing unit 241 receives a command from the interface 230 and transforms the command into a remote command to be transmitted to the mission satellite 140. The satellite command processing unit 241 transmits the remote command to the mission satellite 140 through the control satellite link 220 at a corresponding time based on time information included in the remote command of the central control station 110.

The satellite measurement data processing unit 242 collects the remote measurement data of the mission satellite 140 through the control satellite link 220. Subsequently, the satellite measurement data processing unit 242 transmits the remote measurement data collected from the mission satellite 140 to the interface 230.

The control satellite link 220 controls the mission satellite 140 performing a mission. The control satellite link 220 creates interface with the mission satellite 140 currently performing the mission. That is, the control satellite link 220 transmits the remote command transmitted from the satellite operating block 240 to the mission satellite 140, receives corresponding remote measurement data and transmits the remote measurement data to the satellite operating block 240. Also, the system monitor and control unit 224 receives a command for monitoring and controlling a state of a satellite control device from the interface 230 and transmits state information and control result information to the interface 230.

Figure 3:
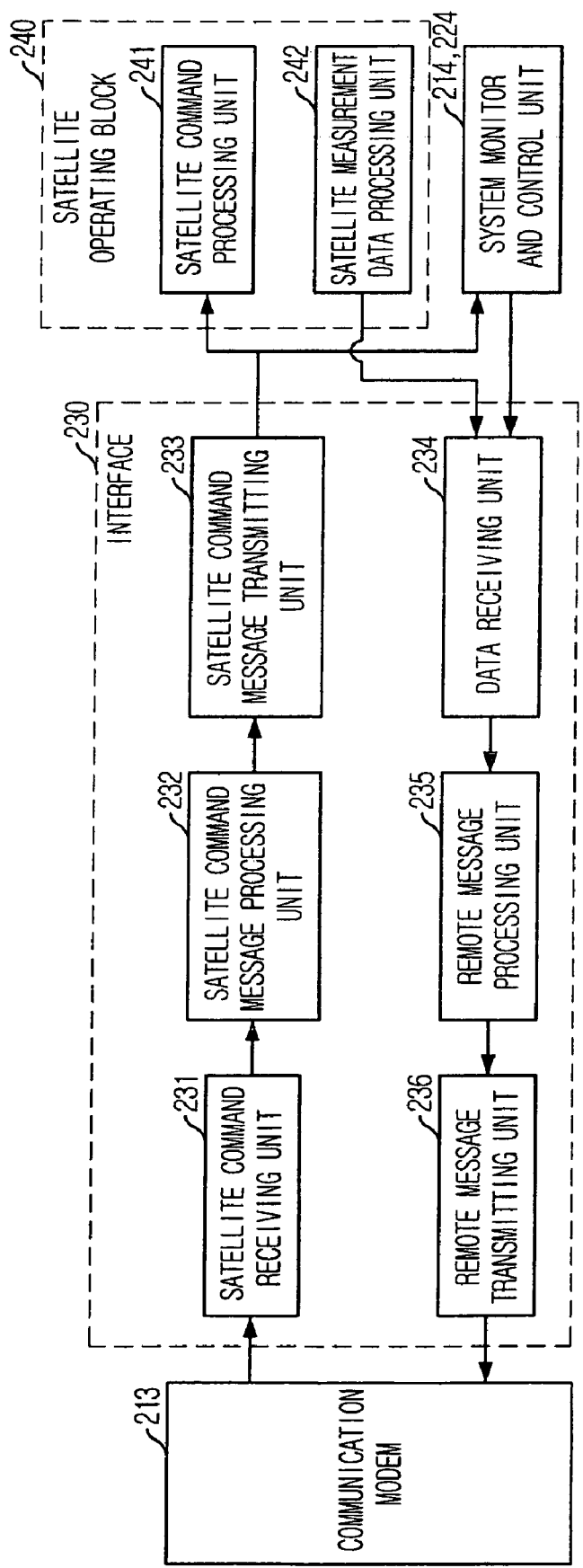
FIG. 3 is a block diagram illustrating an interface of FIG. 2.

FIG. 3 is a block diagram illustrating the interface of FIG. 2. The interface 230 includes a satellite command receiving unit 231, a satellite command message processing unit 232, a satellite command message transmitting unit 233, a data receiving unit 234, a remote message processing unit 235, and a remote message transmitting unit 236.

The satellite command receiving unit 231 receives a command transmitted from the communication satellite link 210. That is, the satellite command receiving unit 231 receives a remote command of the central control station 110 from the communication modem 213 of the communication satellite link 210 through a transmission control protocol (TCP)/Internet Protocol (IP) interface.

The satellite command message processing unit 232 receives and analyzes the remote command from the satellite command receiving unit 231. The satellite command message processing unit 232 transforms the remote command into a message for monitoring and controlling the satellite ground control system 120 or the mission satellite 140 based on an analysis result. Also, the satellite command message processing unit 232 analyzes the satellite command message from the satellite command receiving unit 231 and determines a corresponding destination. When the satellite command message is the monitor and control command for requesting and controlling the device state of the satellite ground control system 120, the system monitor and control units 214 and 224 become the destination. When the satellite command message is the remote command to be transmitted to the satellite performing the mission, the satellite command processing unit 241 of the satellite operating block 240 becomes the destination.

The satellite command message transmitting unit 233 transmits a message to the system monitor and control units 214, 224 or the satellite command processing unit 241 according to the kind of the monitor and control command. That is, the satellite command message transmitting unit 233 transmits a corresponding message to the destination determined in the satellite command message processing unit 232.

The data receiving unit 234 receives data from the system monitor and control units 214, 224 or the remote measurement data processing unit 242. That is, the data receiving unit 234 receives the data from the system monitor and control unit 214 of the communication satellite link 210, the system monitor and control unit 224 of the control satellite link 220, or the satellite measurement data processing unit 242 of the satellite operating block 240. The data receiving unit 234 transmits the received data to the remote message processing unit 235.

The remote message processing unit 235 receives the data from the data receiving unit 234 and transforms the data into a remote message to be transmitted to the central control station 110. That is, the remote message processing unit 235 transforms the data into a format to be transmitted to the central control station 110 and transmits the data to the remote message transmitting unit 236.

The remote message transmitting unit 236 transmits the remote message transformed in the remote message processing unit 235 to the communication satellite link 210. That is, the remote message transmitting unit 236 transmits data to the communication modem 213 of the communication satellite link 210 based on TCP/IP communication.

FIG. 4 is a flowchart describing a satellite control method based on the communication satellite in accordance with an embodiment of the present invention. At step S402, the communication satellite link 210 receives a command for remote monitoring from the central control station through the communication satellite.

At step S404, the interface 230 determines a destination of the command to analyze a command and transmit the command received according to the analysis result to a corresponding processing means. At step S406, the interface 230 transforms the command into a remote command to be transmitted to the satellite according to the determined destination. Also, the interface 230 transforms the command into the monitor and control command for monitoring and controlling the satellite ground control system.

At step S408, the control satellite link 220 receives the transformed remote command and transmits the remote command to the satellite. The system monitor and control units 214 and 224 monitor and control a corresponding device according to the transformed monitor and control command.

At step S410, the communication satellite link 210 receives the remote measurement data, which the control satellite link 220 receives from the satellite, and transmits the remote measurement data to the central control station 110 through the communication satellite. Otherwise, the communication satellite link 210 receives a process result corresponding to the monitor and control command and transmits the process result to the central control station 110 through the communication satellite.

When the remote satellite control is performed, the present invention monitors and controls the satellite ground control system widely distributed from the central control station based on the communication satellite. Accordingly, the present invention can set up the satellite ground control system in a place, which satisfies an optimal condition with no regard to places of the satellite ground control system for controlling the satellite performing a mission.

Also, the present invention creates interface between the central control station and the satellite ground control system based on the communication satellite without using network infrastructure. Accordingly, the present invention can cope with disaster or the error of the communication network.

As described above, the technology of the present invention can be realized as a program and stored in a computer-readable recording medium, such as CD-ROM, RAM, ROM, floppy disk, hard disk and magneto-optical disk. Since the process can be easily implemented by those skilled in the art of the present invention, further description will not be provided herein.

The present application contains subject matter related to Korean patent application No. 2006-0094979, filed with the Korean Intellectual Property Office on Sep. 28, 2006, the entire contents of which are incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A satellite ground control system based on a communication satellite, comprising:

a communication satellite link means for monitoring and controlling a corresponding system device according to a monitor and control command among commands transmitted from an external central control station through the communication satellite and transmitting remote measurement data for a remote command and a process result for the monitor and control command to the central control station through the communication satellite;

an interface for analyzing the transmitted command, transmitting the command to a corresponding processing means and transmitting remote measurement data of a remote command and a process result of the monitor and control command to the communication satellite link means;

a satellite operating means for receiving a command related to a mission satellite from the interface, transforming the command into a remote command and transmitting remote measurement data of the transformed remote command to the interface; and a control satellite link means for transmitting the received remote command in the satellite operating means, receiving the remote measurement data, transmitting the remote measurement data to the satellite operating means, and transmitting a process result of monitor and control of a corresponding system device to the interface according to the monitor and control command from the interface.

2. The system as recited in claim 1, wherein the communication satellite link means includes:
   a communication antenna for transmitting/receiving a Radio Frequency (RF) signal through the communication satellite;
   a communication RF unit which is connected to the communication antenna and processes the RF signal;
   a communication modem for receiving a command from the central control station among signals from the communication RF unit, transmitting the command to the interface, and transmitting remote measurement data of the remote command from the interface and the process result of the monitor and control command to the central control station through the communication RF unit and the communication antenna; and
   a system monitor and control unit for monitoring and controlling the communication antenna, the communication RF unit and the communication modem according to the monitor and control command transmitted from the interface and transmitting the process result to the interface.

3. The system as recited in claim 1, wherein the interface includes:
   a satellite command receiving unit for receiving the command of the central control station from the communication satellite link means;
   a satellite command message processing unit for analyzing and transforming the received command;
   a satellite command message transmitting unit for transmitting the transformed command to a corresponding processing means;
   a data receiving unit for receiving the remote measurement data of the remote command from the satellite operating means or receiving the process result of the monitor and control command from the communication satellite link means and the control satellite link means;
   a remote message processing unit for transforming the received remote measurement data or process result into a remote message to be transmitted to the central control station; and
   a remote message transmitting unit for transmitting the transformed remote message to the communication satellite link means.

4. The system as recited in claim 1, wherein the satellite operating means includes:
   a satellite command processing unit for receiving a command corresponding to the mission satellite among destinations classified in the interface, transforming the command into a remote command and transmitting the command to the control satellite link means; and
   a satellite measurement data processing unit for collecting the remote measurement data of the remote command from the control satellite link means and transmitting the remote measurement data to the interface.

5. A satellite control method based on a communication satellite, comprising the steps of:
   a) receiving a command for remote monitoring through the communication satellite from a central control station;
   b) analyzing the received command, and detecting destinations of the command;
   c) transforming the command into one between a remote command to be transmitted to the mission satellite and a monitor and control command according to the determined destination;
   d) transmitting the transformed remote command to a mission satellite or monitoring and controlling a corresponding device according to the transformed monitor and control command; and
   e) receiving one between remote measurement data transmitted from the mission satellite and a process result of the monitor and control command, and transmitting the remote measurement data to the central control station.

* * * * *